United States Patent [19]

Hopper

[11] 4,316,726
[45] Feb. 23, 1982

[54] METHOD AND APPARATUS FOR PROCESSING FLUIDS

[75] Inventor: James A. Hopper, Erie, Pa.

[73] Assignee: American Sterilizer Company, Erie, Pa.

[21] Appl. No.: 166,755

[22] Filed: Jul. 7, 1980

[51] Int. Cl.³ ............................................. B01D 53/26
[52] U.S. Cl. .......................................... 55/89; 55/92; 55/94; 55/233; 55/238; 55/259; 68/18 C
[58] Field of Search ............... 34/75; 68/18 C; 55/80, 55/84, 90, 92, 233, 238, 259, 267, 522, 525, 526, 89, 97, 527; 210/767, 788, 177, 180, 184, 512.1

[56] References Cited

U.S. PATENT DOCUMENTS

| | | | |
|---|---|---|---|
| 1,608,691 | 11/1926 | Bailey | 55/525 |
| 4,154,003 | 5/1979 | Muller | 34/75 |
| 4,158,449 | 6/1979 | Sun et al. | 55/526 |
| 4,204,339 | 5/1980 | Muller | 34/75 |

*Primary Examiner*—Ivars C. Cintins
*Attorney, Agent, or Firm*—Robert D. Yeager

[57] ABSTRACT

The application discloses a method and apparatus for processing liquid-containing fluids present in a work chamber at elevated temperature; the method and apparatus are particularly useful in connection with a steam/hot water washing machine. A housing is provided in fluid communication with the work chamber; the housing includes a tortuous path for the escape of hot moist air into the atmosphere during operation of the work chamber. Thereafter, a blower is energized to withdraw hot moist air from the work chamber and swirl it within the housing around filter means comprising the tortuous path. The swirling, hot moist air is subjected to cooling fluids for the purpose of condensing water vapor and removing heat from the system.

15 Claims, 5 Drawing Figures

METHOD AND APPARATUS FOR PROCESSING FLUIDS

BACKGROUND OF THE INVENTION

1. Field of the Invention

This invention relates to a method and apparatus for processing condensable fluids present in a work chamber at elevated temperatures.

2. Description of the Prior Art

In washing and cleaning systems wherein unit operations are carried out in a working chamber under elevated temperatures and employ fluids, it is generally desired to safely vent non-condensable fluid and eliminate heat and objectionable liquid from the working chamber; it may also be desired to replace the working chamber atmosphere with ambient air. While condensation and cooling may take place in the main working chamber (see U.S. Pat. No. 3,900,339) a condensation unit is often disposed outside of the main working chamber as in U.S. Pat. No. 3,877,516 which uses pipe heat exchange means; or as in U.S. Pat. No. 4,204,339, which uses a liquid spray in the unit for heat exchange cooling and condensation. In the latter patent, hot moist air from the washer-dryer is subjected to turbulent flow as it is withdrawn therefrom. The moisture present in the air is condensed with water jets and the condensate separated from the air. The water stream is pumped out and the air is heated and recirculated to the working chamber by an impeller. However, the patent does not teach venting of heat; contrariwise, the patent teaches that heat should be added to the recirculating air. Furthermore, ambient atmospheric air plays not part in the system.

SUMMARY OF THE INVENTION

The present invention provides a method and apparatus for processing fluids present in a work chamber at elevated temperatures to permit venting of hot gas directly to the atmosphere after removing liquid therefrom and thereafter to cool and dry the atmosphere of the work chamber.

The present invention provides an apparatus for processing fluids present in a work chamber at elevated temperatures comprising: a substantially cylindrical housing having a pair of ports formed in its end walls, a first such port being in fluid communication with the work chamber and a second such port being in communication with the atmosphere, and having an inlet port formed therein; means disposed within the housing for obstructing straight-line fluid flow between the pair of ports; filter means disposed within the housing in the path of available fluid communication between the pair of ports for permitting passage of gases therethrough while promoting therein condensation and collection of liquids, the filter means being spaced away from the cylindrical wall of the housing to define therebetween an annular fluid flow passageway; means in fluid communication with the work chamber and the inlet port of the housing for withdrawing the fluids from the work chamber and introducing them into the annular passageway; and means disposed within the housing for introducing fluid coolant into the annular passageway.

The present invention further provides a method for processing liquid-containing fluids present in a work chamber at elevated temperature comprising the steps of: providing a tortuous path of fluid communication between the work chamber and the outside atmosphere, the tortuous path having disposed therein filter means adapted to permit passage of gases and retard passage of liquid; permitting the liquid-containing fluids present in the work chamber to flow along the tortuous path in a first direction during periods of a first pressure differential between the work chamber and the atmosphere; thereafter withdrawing the liquid-containing fluids from the work chamber and forcing them to flow in an annulus surrounding the tortuous path, the annulus being in fluid communication with the tortuous path to permit the withdrawn fluids, after flowing in the annulus, to return to the work chamber; cooling the withdrawn liquid-containing fluids as they flow in the annulus; and permitting the flow of atmospheric gas along the tortuous path in a second direction opposite to the said first direction when the pressure differential between the work chamber and the atmosphere reverses.

Other details and advantages of the present invention will become apparent as the following description, taken with the accompanying drawings, proceeds.

DETAILED DESCRIPTION OF THE PREFERRED EMBODIMENTS

The fluid processing method and apparatus of the present invention are especially useful when used in conjunction with large washing units that employ steam and hot water in the wash cycle. The operation of such washing units produce within the washing chamber hot air containing water vapor at various stages of saturation, some of the air being below the dew point with the consequent formation of mist. Unless the washing unit is connected to an in-house venting system, this moist hot air would pose a hazard to workers upon opening the washer chamber after completion of a wash cycle. Accordingly, the present invention will be described, in the following non-limiting example, as it could be used in conjunction with a steam/hot water washer.

Figure 1:
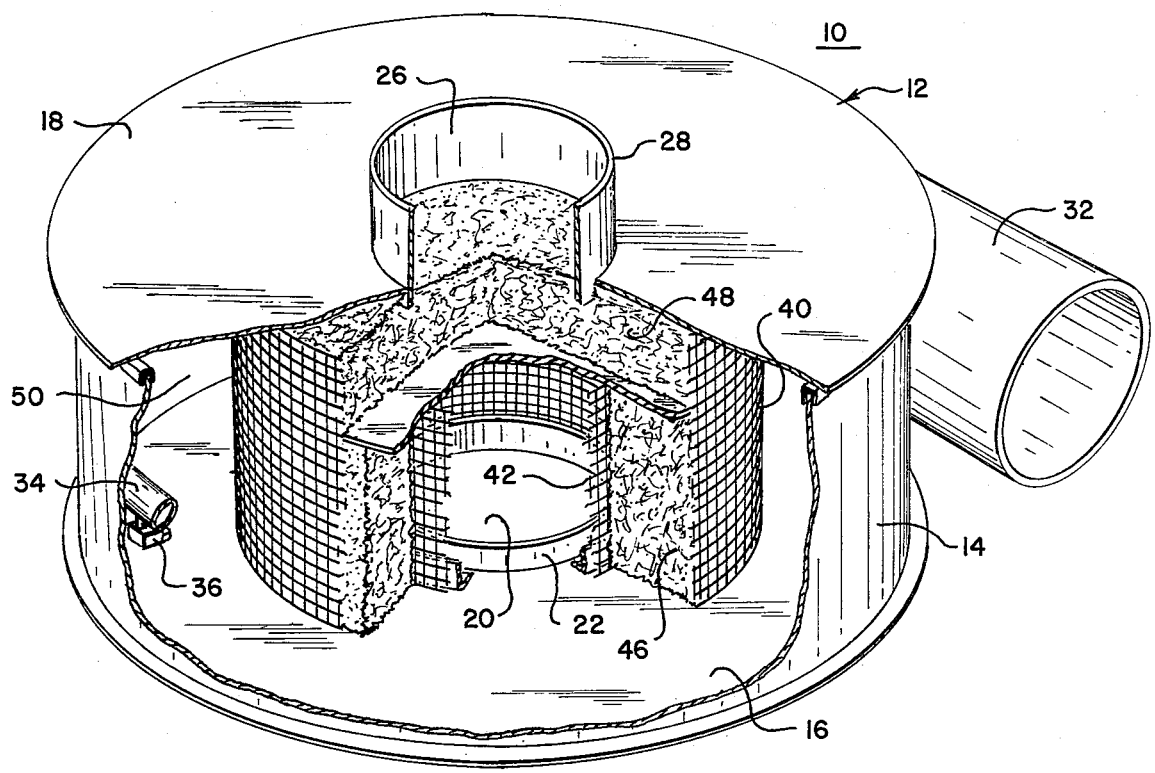
FIG. 1 is an isometric view of the fluid processing unit of the present invention with portions broken away for clarity.
Figure 2:
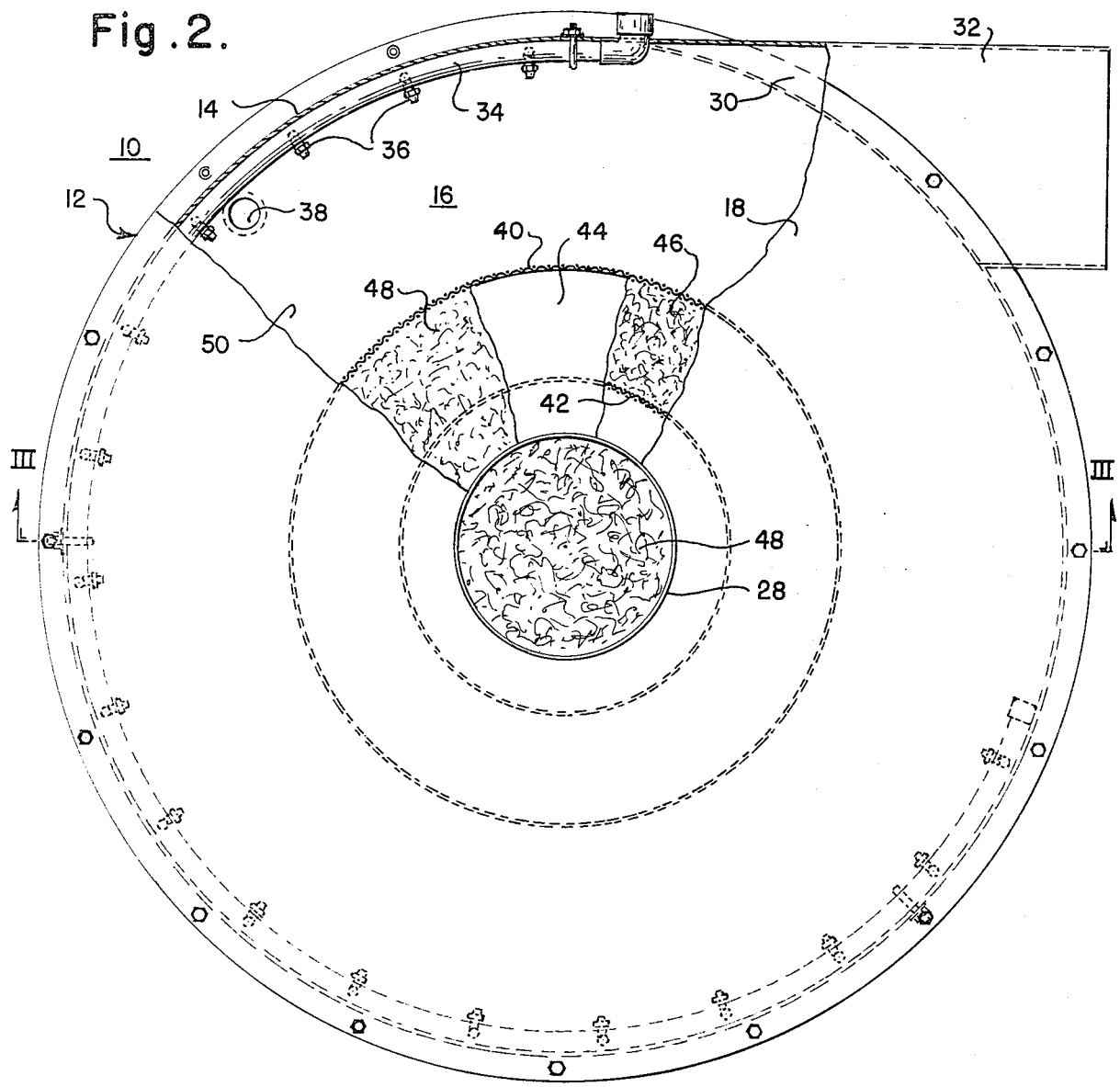
FIG. 2 is a top plan view of the unit of FIG. 1, with portions broken away for clarity.
Figure 3:
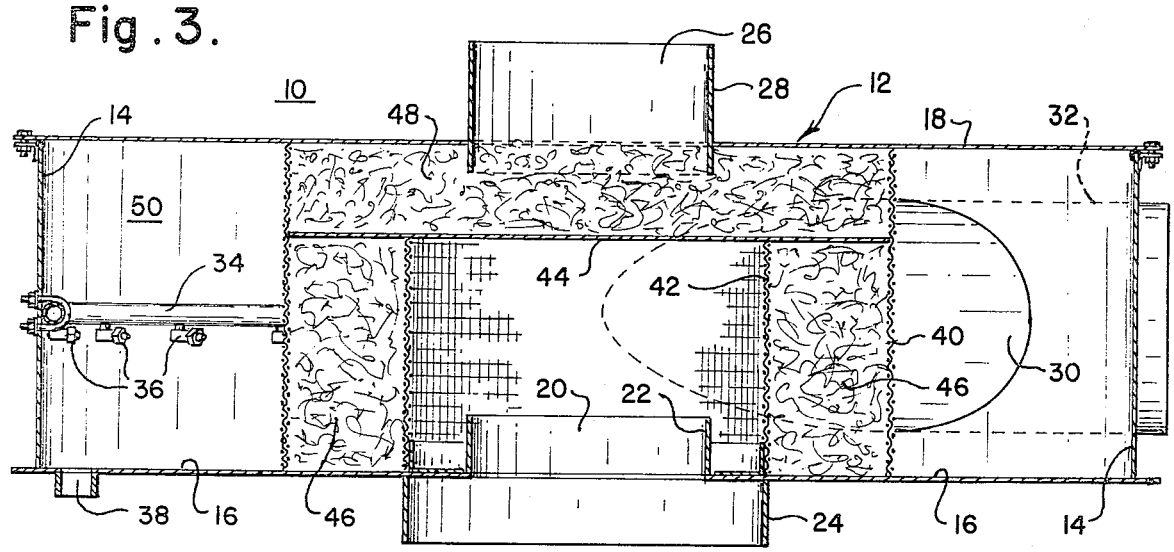
FIG. 3 is a sectional view taken along the line III—III of FIG. 2.

Referring to the drawings, particularly to FIGS. 1-3, there is shown fluid processing unit 10 of the present invention. Fluid processing unit 10 includes a housing, generally designated by the numeral 12 and formed of suitable material, comprising a cylindrical side wall 14, a floor 16 and a roof 18. Floor 16 has a central port 20 surrounded by cylindrical dam 22 which extends into housing 12. Extending beneath floor 16 is cylindrical flange 24 of somewhat greater diameter than port 20 to form a connection for other duct-work.

Roof 18 has a central port 26, preferably axially-aligned with port 20 and of generally the same diameter. Cylindrical flange 28 surrounds port 26, extending slightly into housing 12, to provide a chimney for port 26.

Opening 30, preferably formed in a portion of cylindrical side wall 14, is adapted to receive a straight section of duct 32 which leads from a blower soon to be described. The joinder of duct 32 to housing 12 is intended to provide a relatively smooth transition to centrifugal flow of fluid within housing 12 as the fluid enters tangentially through opening 30.

Water pipe 34, connected to a source of cold water (not shown), extends around a portion of the inside of cylindrical wall 14 to form a manifold for a plurality of spaced spray nozzles 36 connected thereto. In a preferred embodiment, the axes of spray nozzles 36 are directed radially inwardly toward the center of housing 12. In another embodiment, the axes may be inclined in the direction of fluid flow around the periphery of housing 12. Drain 38 is provided in floor 16. The provision of dam 22 and drain 38 prevents any water accumulated on floor 16 from flowing through floor port 20.

Arranged concentrically around the axis of ports 20 and 26 are a pair of cylindrical screen members 40 and 42, each being open at both ends. The purpose of these screens is to confine filter material in a manner soon to be described. Outer screen 40 extends the entire distance between roof 18 and floor 16. Inner screen 42, having a diameter slightly greater than floor port 20, extends from floor 16 upwardly beyond the midpoint between floor 16 and roof 18. A solid, round plate 44, having at least the same diameter as outer screen 40, is supported transversely of the axis of ports 20 and 26 by inner screen 42. Plate 44 serves to obstruct the straight-through passage of fluids between ports 20 and 26.

Packed within the confines of outer screen 40, inner screen 42, the bottom of plate 44 and floor 16, is a fibrous material. It has been found that Monel (a trademark of International Nickel Co., Inc. for nickel-copper corrosion resistant alloys) fibers are particularly useful in the environment of a washing unit because of their corrosion resistant properties. Likewise aluminum fibers may be advantageously employed. The packed fibers just described form a tube of filtering material surrounding floor port 20, the tube being referred to hereinafter as filter tube 46.

Packed within the confines of outer screen 40, the top of plate 44 and roof 18, is fibrous material similar to that used in filter tube 46. These packed fibers form a disc of filtering material confronting roof port 26 and will be referred to hereinafter as filter disc 48.

It may be seen that with screens 40 and 42, plate 44, filter tube 46 and filter disc 48 in place, an annular passage 50 is formed within housing 12 by the aforementioned items and cylindrical side wall 14, although, as soon to be described, fluid flow communication between annulus 50 and each of ports 20 and 26 is provided.

Figure 4:
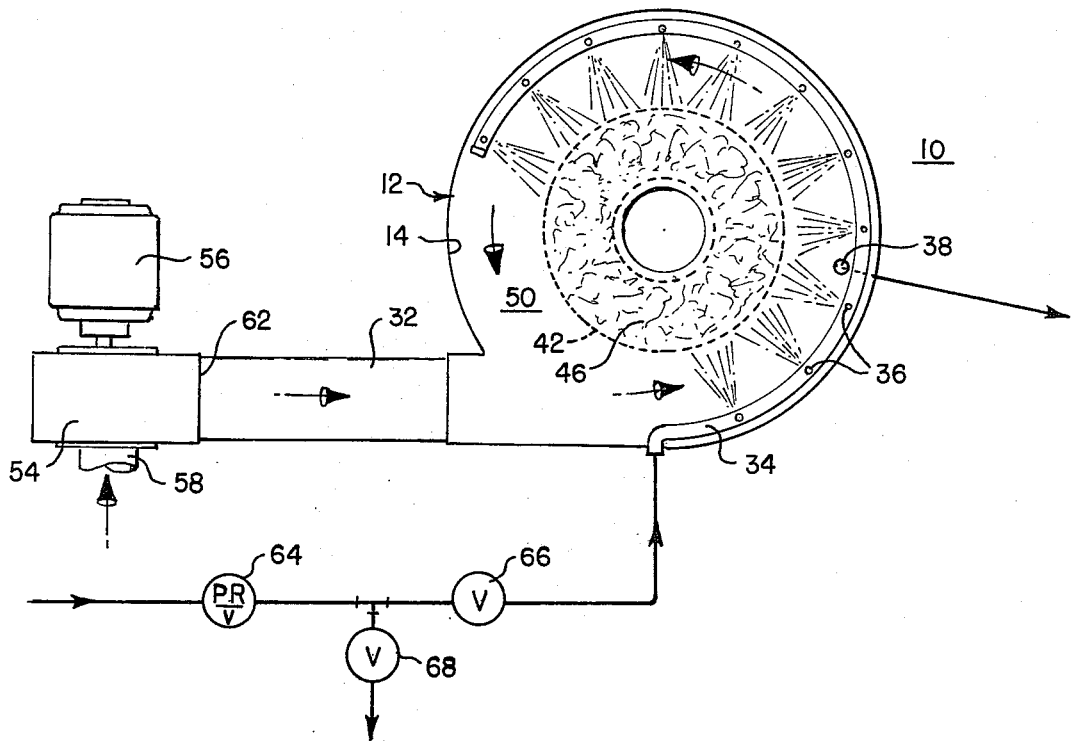
FIG. 4 is a diagrammatic top plan view of the fluid processing unit of FIG. 1 in association with other components to illustrate the operation of the present invention.
Figure 5:
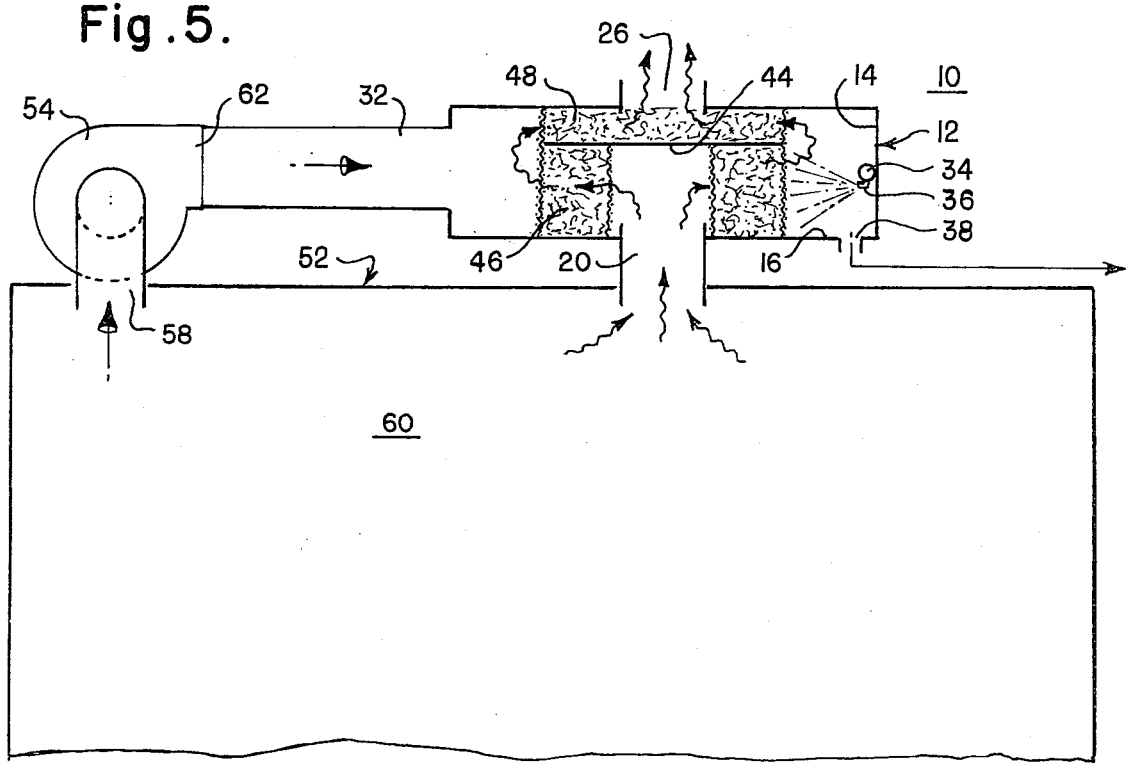
FIG. 5 is a diagrammatic elevational view of the showing of FIG. 4, further illustrating the operation of the present invention.

Referring now to FIGS. 4 and 5, the operation of the present invention will now be described. In FIG. 5, fluid processing unit 10 is shown mounted atop a work chamber, in this case a steam/hot water washing machine 52. Blower 54, driven by motor 56, also is mounted atop washing machine 52. The inlet 58 of blower 54 is in fluid communication with the chamber 60 of washing machine 52. The outlet 62 of blower 54 is in fluid communication with annulus 50 of housing 12 through duct 32.

A source of cold water for water pipe 34 within housing 12 is shown schematically in FIG. 4. Cold water (32°–72° F.) flows through pressure regulator 64 and through control valve 66 to enter water pipe 34. A second valve 68 is provided to selectively cause cold water to flow to the wash tank (not shown) of washing machine 52. This provides a means for lowering the temperature of the rinse water in the wash tank at the end of the wash cycle from about 180° F. to about 140° F.

During the wash cycle in washing machine 52, steam and hot water are introduced into chamber 60 for the purpose of performing the desired washing operation on soiled goods within chamber 60. Air trapped within chamber 60 is thereby heated and expands. Because chamber 60 is not a pressure vessel, the expanded air must be vented; venting is accomplished by the expanded air taking the path shown by the arrows in FIG. 5. This path deliberately is made tortuous. Air passing through port 20 is deflected by plate 44 and is forced to pass into filter tube 46. Because plate 44 is at least coextensive with the outside diameter of filter tube 46, the air must pass out of filter tube 46 and into annulus 50. The air continues to rise, enters filter disc 48 at its edges, and proceeds inwardly to the central portion of filter disc 48 until it can pass out of housing 12 through port 26.

As the heated air laden with water vapor and finely-divided water droplets proceeds along the tortuous path just described, the air is cooled, thereby promoting condensation of water vapor therefrom. Filter tube 46 and filter disc 48, with their packed fibers, trap the water droplets entrained in the flowing air and serve as condensation surfaces for the water vapor. Eventually, the condensed and trapped water droplets in filter disc 48 work their way to the edges of plate 44 and drop onto floor 16; likewise, the water condensed and trapped in filter tube 46 gravitates to floor 16. The water thus accumulated on floor 16 flows out of housing 12 through drain 38. The air passing out of port 26 may be safely vented directly to the atmosphere because it has been dried and cooled sufficiently.

Upon completion of the washing cycle within chamber 60, chamber 60 is clouded with mist at elevated temperature. While venting of the chamber through the tortuous path described above continues by reason of the pressure differential between chamber 60 and the atmosphere, it is desirable to accelerate the cooling and drying of chamber 60 so that the chamber may be opened and the load removed.

Accordingly, blower 54 is energized to draw the hot moist air from chamber 60 and to blow it into annulus 50 of housing 12. At the same time, valve 66 is opened to admit cold water under pressure to water pipe 34 and thus to spray nozzles 36. As the hot moist air flows around annulus 50, centrifugal force tends to force entrained water droplets to cylindrical side wall 14 where they collect and flow to drain 38. In addition, the cold water sprays from nozzles 36 are brought into direct heat exchange relationship with the swirling air to promote cooling of the air and condensation of water vapor. The injected water as well as the separated water droplets produced in annulus 50 also flow to drain 38; consequently, heat is also removed from the system. The subjecting of the hot moist air withdrawn from chamber 60 to centrifugal force may be, as will be appreciated by those skilled in the art, achieved by a variety of other means than the means described herein.

Because blower 54 forces the hot moist air into housing 12 under pressure and the vapor pressure of water in chamber 60 is constantly being reduced, the cooled air within housing 12 will tend to return to chamber 60. The path for this return will be through filter tube 46 and port 20 to chamber 60. As the total pressure in chamber 60 decreases due to the aforesaid reduction in the vapor pressure of water therein, fresh air from the atmosphere is drawn into housing 12 through port 26 and takes the reverse of the tortuous path described above. This inflow of new air serves to maintain equilibrium of the system during blower operation.

As the now cooler air passes through filter tube 46, additional moisture is removed by the fibrous material as described above. The cooler air returned to chamber 60 picks up additional heat and moisture and is returned to housing 12 to undergo the cycle described above.

The flow of cooler, drier air into chamber 60 during the cycle and corresponding reduction in the vapor pressure of water in the chamber provide an additional benefit of the present invention because the air tends to flash moisture from the surfaces of goods comprising the chamber load and from the interior surfaces of the chamber. This drying effect eliminates the need for a separate drying station for the goods as is now required with conventional washers of the type described herein.

For a fixed capacity blower, the rate of heat removal from the overall system is greater at the beginning of blower operation than at the end. It therefore becomes necessary to reduce the rate of flow of cold water to spray nozzles 36 as the cycle proceeds or to operate the spray nozzles intermittently during the cycle. Spray degradation at lower water pressures tends to make the latter option preferable. Even when the sprays are not in use, the heat capacity of the system causes water separation to continue. Blower 54 is de-energized when the temperature in chamber 60 reaches the desired lower temperature and the chamber is clear of any clouded condition.

It has been found that with a washer chamber 60 having a volume in the range of 200–325 cubic feet, a blower 54 having a capacity of 1025 scfm and a cold water flow rate in nozzles 36 of 30 gallons per minute, 150 seconds of blower operation is needed to complete a temperature reduction of chamber air from 180° F. to 140° F. by the present invention. Under these conditions, if cold water flow to nozzles 36 is stopped after 105 seconds and restarted at 120 seconds for a 15 second period, chamber 60 clears more quickly. A corresponding temperature reduction is effected in the wash tank after 60 seconds of operation of valve 68.

What is claimed is:

1. Apparatus for processing fluids present in a work chamber at elevated temperatures comprising:
   a substantially cylindrical housing having a pair of ports formed in its end walls, a first such port being in fluid communication with said work chamber and a second such port being in communication with the atmosphere, and having an inlet port formed therein;
   means disposed within said housing for obstructing straight-line fluid flow between said pair of ports;
   filter means disposed within said housing in the path of available fluid communication between said pair of ports for permitting passage of gases therethrough, while promoting therein condensation and collection of liquids, said filter means being spaced away from the cylindrical wall of said housing to define therebetween an annular fluid flow passageway;
   means in fluid communication with said work chamber and said inlet port of said housing for withdrawing said fluids from said work chamber and introducing them into said annular passageway; and
   means disposed within said housing for introducing fluid coolant into said annular passageway.

2. Apparatus as recited in claim 1 wherein:
   said pair of ports are axially aligned.

3. Apparatus as recited in claim 1 wherein:
   said withdrawing and introduction means is a blower.

4. Apparatus as recited in claim 1 wherein:
   said obstructing means comprises a plate having a surface area greater than the area of either one of said pair of ports.

5. Apparatus as recited in claim 4 wherein said filter means comprises:
   a first tubular portion disposed between said plate and one of said pair of ports, coaxially with said port; and
   a second portion disposed between said plate and the other of said pair of ports and being of generally disc-shape.

6. Apparatus as recited in claim 1 wherein:
   said filter means comprises fibrous material confined at the vertical surfaces of said filter means by a perforated support member.

7. Apparatus as recited in claim 6 wherein:
   said fibrous material comprises fibers of a nickel-copper corrosion resistant alloy.

8. Apparatus as recited in claim 6 wherein:
   said fibrous material comprises aluminum fibers.

9. Apparatus as recited in claim 6 wherein:
   said perforated support member comprises a screen.

10. Apparatus as recited in claim 1 wherein:
    said fluid coolant introduction means comprises a plurality of spray nozzles spaced along said annular passageway.

11. Apparatus for cooling and drying the working fluids present in the chamber of a washing machine comprising:
    a substantially cylindrical housing having a port at each end, one such port being in fluid communication with said chamber and the other port being vented to atmosphere, and having an inlet port formed in its cylindrical wall;
    means disposed within said housing for deflecting the flow of fluids between said ports;
    fibrous material packed in the available paths of fluid communication between said ports, said material being adapted to permit airflow therethrough but to condense water vapor thereon and entrap water droplets therein, said fibrous material being spaced away the cylindrical wall of said housing to define therebetween an annular flow passage;
    a blower having its inlet in fluid communication with said chamber and its outlet in fluid communication with said inlet port of said housing, said blower being adapted to withdraw hot working fluids from said chamber and tangentially introduce them into said annular flow passage; and
    a plurality of spray nozzles spaced around at least a portion of said annular flow passage for bringing cooling water into contact with said working fluids flowing in said passage.

12. A method for processing liquid-containing fluids present in a work chamber at elevated temperature comprising the steps of:

providing a tortuous path of fluid communication between said work chamber and the outside atmosphere, said tortuous path having disposed therein filter means adapted to permit passage of gases and retard passage of liquids;

permitting said liquid-containing fluids present in said work chamber to flow along said tortuous path in a first direction during periods of a first pressure differential between said work chamber and the atmosphere;

thereafter withdrawing said liquid-containing fluids from said work chamber and forcing them to flow in an annulus surrounding said tortuous path, said annulus being in fluid communication with said tortuous path to permit said withdrawn fluids, after flowing in said annulus, to return to said work chamber;

cooling said withdrawn liquid-containing fluids as they flow in said annulus; and permitting the flow of atmospheric gas along said tortuous path in a second direction opposite to said first direction when the pressure differential between said work chamber and said atmosphere reverses.

13. The method recited in claim 12 which further comprises:

collecting and removing liquid retarded by said filter means.

14. The method recited in claim 12 wherein:

said cooling of said withdrawn liquid-containing fluids flowing in said annulus comprises bringing liquid into heat exchange contact with said fluids.

15. The method recited in claim 14 which further comprises:

collecting and removing liquid present in said annulus.

* * * * *